United States Patent [19]

King

[11] 3,793,488

[45] Feb. 19, 1974

[54] DATA COMMUNICATION SYSTEM WITH ADDRESSABLE TERMINALS

[75] Inventor: Claude F. King, Rolling Hills, Calif.

[73] Assignee: Receptors, Redondo Beach, Calif.

[22] Filed: June 3, 1971

[21] Appl. No.: 149,513

[52] U.S. Cl. .......................... 179/15 BA, 179/15 BS

[51] Int. Cl. .............................................. H04j 3/00

[58] Field of Search 179/15 BA, 15 A, 15 AL, 15 BS; 178/69.5 R

[56] References Cited

UNITED STATES PATENTS 3,445,815 5/1969 Saltzberg .......................... 340/163

*Primary Examiner*—Kathleen H. Claffy
*Assistant Examiner*—David L. Stewart
*Attorney, Agent, or Firm*—Lindenberg, Freilich & Wasserman

[57] ABSTRACT

A system for communicating addressed data over a single channel amongst a plurality of dispersed stations. The channel can comprise any of a variety of communication media such as twisted pair wire, telephone line, radio frequency, etc., singly or in combination. An address generator is coupled to the channel for applying a sequence of address bit signals thereto to successively define a plurality of different multi-bit addresses. Each station monitors the address information on the channel and, will either apply a data word to or extract a data word from the channel for each address appropriate to that station. Each address bit will be maintained on the channel for one address bit period. During each address bit period, one multi-bit data word can be placed on the channel. An address bit format is employed which enables each station to extract both data bit and address bit synchronization from the channel as well as the address and data information.

11 Claims, 8 Drawing Figures

INVENTOR.
CLAUDE F. KING
BY
Lindenberg, Freilich & Wasserman
ATTORNEYS

INVENTOR.
CLAUDE F. KING

BY Lindenberg, Freilich + Wasserman

ATTORNEYS

| | | | | | |
|---|---|---|---|---|---|
| (1) | 000000 | → (22) | 000101 | → (43) | 110111 |
| (2) | 100000 | (23) | 100010 | (44) | 111011 |
| (3) | 110000 | (24) | 110001 | (45) | 011101 |
| (4) | 111000 | (25) | 011000 | (46) | 001110 |
| (5) | 111100 | (26) | 101100 | (47) | 100111 |
| (6) | 111110 | → (27) | 110110 | → (48) | 010011 |
| (7) | 111111 | (28) | 011011 | (49) | 101001 |
| (8) | 011111 | → (29) | 001101 | (50) | 010100 |
| (9) | 001111 | (30) | 100110 | (51) | 101010 |
| (10) | 000111 | (31) | 110011 | (52) | 110101 |
| → (11) | 000011 | (32) | 011001 | (53) | 011010 |
| (12) | 100001 | → (33) | 001100 | (54) | 101101 |
| (13) | 010000 | (34) | 000110 | (55) | 010110 |
| (14) | 101000 | (35) | 100011 | (56) | 101011 |
| (15) | 110100 | (36) | 010001 | (57) | 010101 |
| (16) | 111010 | (37) | 001000 | (58) | 001010 |
| (17) | 111101 | (38) | 100100 | (59) | 100101 |
| (18) | 011110 | (39) | 110010 | → (60) | 010010 |
| (19) | 101111 | (40) | 111001 | (61) | 001001 |
| (20) | 010111 | (41) | 011100 | → (62) | 000100 |
| (21) | 001011 | (42) | 101110 | → (63) | 000010 |
| | | | | (64) | 000001 |

INVENTOR.
CLAUDE F. KING
BY Lindenberg, Freilich + Wasserman
ATTORNEYS

INVENTOR.
CLAUDE F. KING
BY Lindenberg, Freilich & Wasserman
ATTORNEYS

INVENTOR.
CLAUDE F. KING

BY Lindenberg, Freilich + Wasserman

ATTORNEYS

INVENTOR.
CLAUDE F. KING
BY Lindenberg, Freilich & Wasserman
ATTORNEYS

DATA COMMUNICATION SYSTEM WITH ADDRESSABLE TERMINALS

BACKGROUND OF THE INVENTION

1. Field of the Invention

This invention relates to a system for communicating addressed data between a plurality of dispersed stations over a common channel.

2. Description of the Prior Art

The prior art is replete with various types of digital communication systems for communicating data between dispersed stations. Most such systems are quite complex and as a consequence quite costly.

Recently, the need for simple, low cost data communication systems has been recognized for allowing communication of relatively slowly varying data, as between a central station and remote monitoring transducers. For example, in a process control system, it may be necessary to periodically communicate readings from a plurality of remote transducers to a central station. In order to minimize costs, it is normally desirable that such communication take place over a common channel multiplexed so as to enable the data received at the central station to be ascribed to a particular remote transducer. In many systems, it is also desirable to enable data to be communicated from the central station to any particular, that is "addressed", remote station to, for example, modify an established set point. More generally, it is important for some applications that the system permit two-way addressed data communication between any pair of system stations.

U.S. Pat. No. 3,445,815 discloses a system which enables a plurality of remote stations to be monitored and controlled from a central station. The system disclosed therein employs an address generator for generating a sequence of 31 bits in which there are no repeated subsequences of five or more bits. Each remote station receives the sequence of bits and compares it with a locally generated sequence. If the received and locally generated sequence are identical for a sufficient number of bits, then when the last five bits received are the same as the remote station address, a control signal is developed to operate the remote station as desired. Thus, while each station requires five bits of information to define its address, only one additional address bit is required to define the address of a different station. New address bits are generated in response to a slow clock which defines a sufficiently long period to enable a specific portion of the period to be reserved for transmission of a reply message from the addressed station.

SUMMARY OF THE INVENTION

The present invention is directed to an improved system for communicating addressed data between dispersed stations over a common channel by generating a sequence of M-bits having no repeating subsequences of N or more bits where each N-bit subsequence constitutes an address defining a remote station. The generation of each bit of said M-bit sequence defines a new N-bit address identifying a different remote station.

In accordance with the preferred embodiment of the invention, an improved address generator is provided including a sequence logic network comprised of an N stage shift register which, with a minimum hardware configuration, produces an M-bit sequence defining $2^N$ unique N-bit subsequences. The minimum hardware configuration includes a feedback network for normally entering the complement of stage N into stage 1. When so doing would produce a repeat state, then instead, the output of stage N is entered into stage 1 without inversion. Thus, the feedback network need merely recognize when a repeat state is about to occur and abort it by forcing a previously undefined state.

In accordance with the present invention, a coding format is employed which enables a string of characters (i.e., binary digits or bits) to flow along a channel such that addressed data can be read from or written onto the string in synchronism therewith and at a time determined by the address. More particularly, address bits (either 1 or 0) are represented on the channel by a coding format containing synchronization information, which can be extracted at each remote station, dividing each address bit period into a plurality of equal duration subperiods distributed throughout the entire address bit period. Each of these sub periods constitutes a data bit period in which a single data bit can be applied to the channel.

In the preferred embodiment of the invention, an address signal format is employed in which a plurality of equally spaced signal level transitions occur during each address bit period so as to thereby define a plurality of data bit periods in each address bit period. Means are provided at each remote station for detecting the occurrence of each of these equally spaced signal transitions. Additionally, means are provided at each station for detecting a particular one of the equally spaced transitions occurring during each address bit period for the purpose of achieving address bit synchronization.

In accordance with a significant feature of the invention, the selected signal format allows data bits to be inserted into the channel signal in synchronism therewith with each data bit occupying a specific fractional portion of a data bit period.

Figure 1:
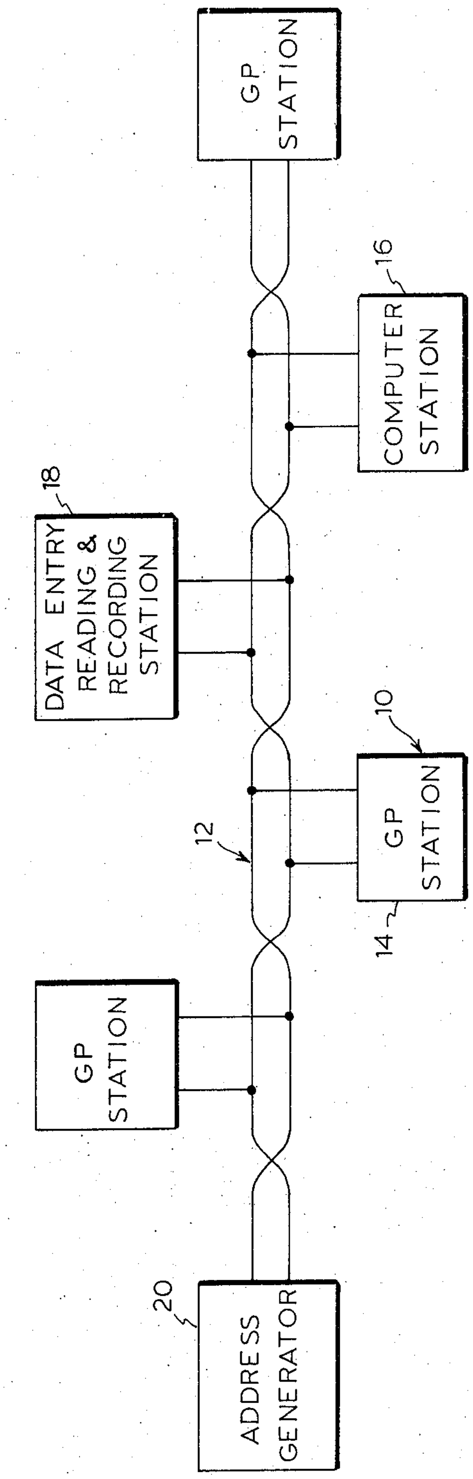
FIG. 1 is a block diagram of a data communication system in accordance with the present invention.

Attention is now called to FIG. 1 which illustrates a block diagram of a typical data communication system embodying the present invention. As will be more readily understood hereinafter, a data communication system in accordance with the present invention enables data to be communicated from a source station, which can be any one of a plurality of dispersed stations, to a destination station, which can be any other one of the plurality of stations, over a common channel. The channel can constitute any type of communication media such as twisted pair wire, telephone lines, radio frequency, optical, etc., singly or in combination. Regardless of the particular type of channel utilized, the channel is time division multiplexed, in accordance with the present invention, so that each specific time slot within an overall system cycle is dedicated to a specific data word address. Each remote station can respond to one or more of such addresses and multiple stations can respond to a single such address.

The typical system of as shown in FIG. 1, means addressed data to be transferred between any pair of a plurality of dispersed stations 10 over a communication channel 12. The stations 10 can take many different forms, well known in the art, and for exemplary purposes herein, are grouped into three different types; namely, a general purpose station 14, a computer station 16, and a data entry reading and recording station 18.

The term "general purpose" station refers to any station comprised of a basic modem plus one or more source and/or utilization devices. As an example of a source device, a general purpose station could include a temperature transducer which provides a digital signal indicative of measured temperature. A utilization device can comprise any device responsive to digital data such as a display device or a group of relays.

The term "computer" station is intended to denote a station having a basic modem and, in addition, a special or general purpose computer for performing arithmetic operations such as scaling, smoothing, conversion, etc.

The term "data entry reading and recording" station refers to a station comprised of a basic modem plus a direct human communication device such as an input-output keyboard. Such a device can be readily portable and can be easily tapped into the channel 12 at any point to introduce or extract data from the channel.

In addition to the aforementioned stations, the system of FIG. 1 includes an address generator 20 which, functions to apply an address signal to the channel successively defining distinct addresses. Each of the stations coupled to the channel has one or more addresses alotted thereto and when its address appears on the channel, the addressed station can accept data from the channel or apply data to the channel, depending on whether the station is operating in a send or receive mode. In accordance with preferred embodiments of the invention, the address generator 20 cyclically generates a sequence of M binary digits or bits, the sequence preferably being selected to contain a plurality of nonrepetitive subsequences of N bits. Each such subsequence constitutes a station address and is defined once for each cycle of address generator 20. Although the address generator 20 is illustrated in FIG. 1 as constituting a separate station connected to the channel at one end thereof, it should be understood that the address generator can usually be located at substantially any point on the channel and is preferably located coincident with the equipment at any one of the dispersed stations.

Figures 2A, 2B:
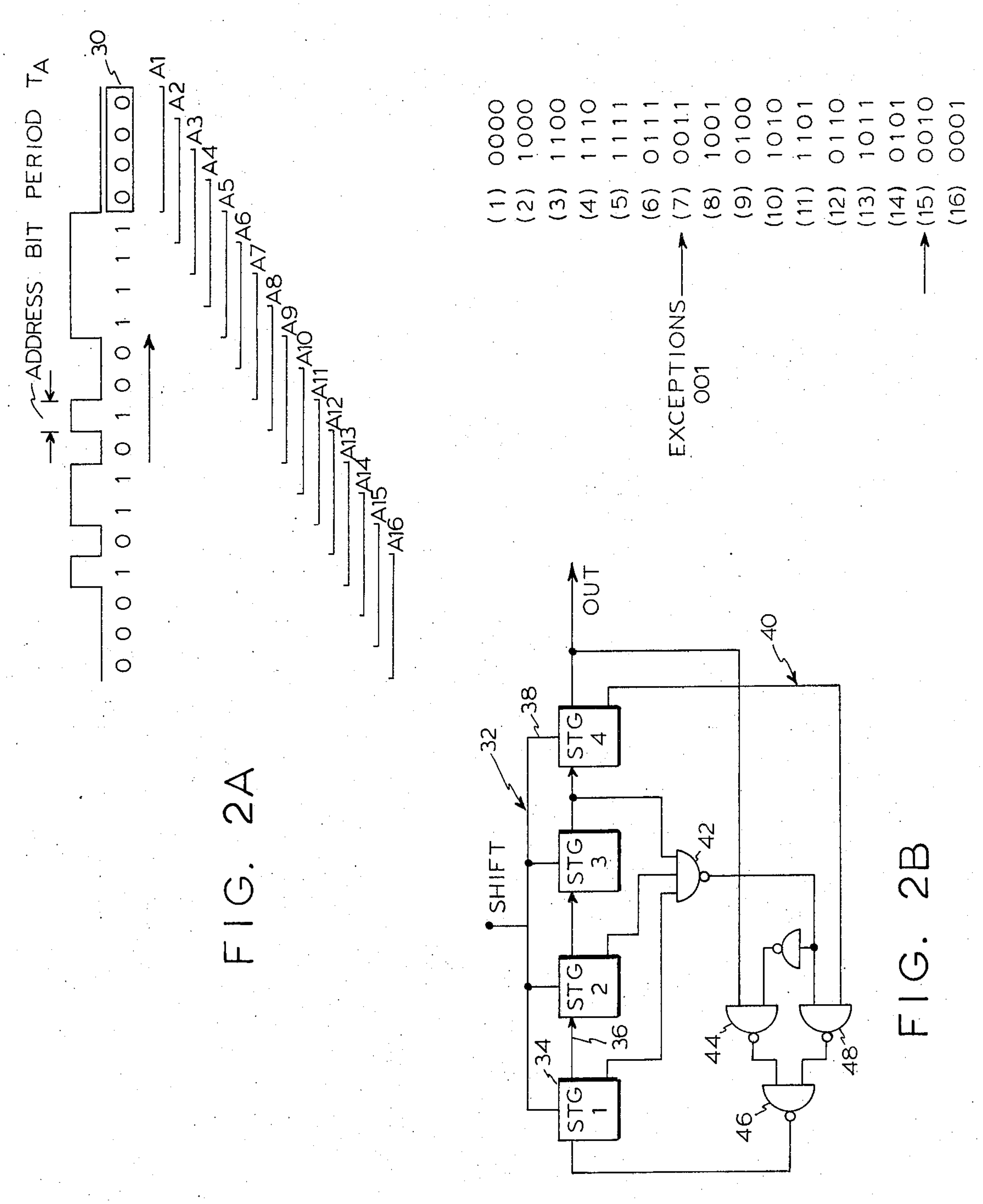
FIG. 2A is a diagram illustrating a typical sequence of M-bits ($m$=16) which includes $2^N$ (N=4) unique subsequences of N-bits.
FIG. 2B is a block diagram of a preferred embodiment of a four stage sequence logic network for producing the M-bit sequence illustrated in FIG. 2A.

Attention is now called to FIG. 2A which depicts a preferred type of bit sequence for successively defining multibit station addresses in accordance with the present invention. More particularly, consider that the M (where M=16) bit sequence of FIG. 2A is shifting to the right, one bit at a time. Note that every N (where N=4) bit subsequence is unique within the M bit sequence. Thus, the 19 bit sequence illustrated in FIG. 2A yields 16 four-bit subsequences respectively identified as A1–A16. It is important to recognize a significant characteristic of the bit sequence of FIG. 2A and that is that as each bit in the sequence is successively developed, a new four-bit subsequence or address is formed. More particularly, note the address A1 in FIG. 2A, represented in a depicted four-bit address window 30. Note that as the M-bit sequence is shifted one bit to the right, a 1 bit will be brought into the left most stage of the address window 30 and a different address A2 will then be defined. Accordingly, within the 16 address bit periods constituting one cycle of the bit sequence illustrated in FIG. 2A, 16 unique four-bit addresses are defined. As will be seen, in accordance with the present invention, the address generator 20 of FIG. 1 applies an address signal, representing the address bit sequence of FIG. 2A, to the channel in accordance with a particular signal format. As each different four bit address A1–A16 moves into what may be considered the effective address window 30, a different address time slot becomes operational for a station to, apply data to the channel. One or more stations can also become active at that time to extract that data from the channel.

Figure 2C:
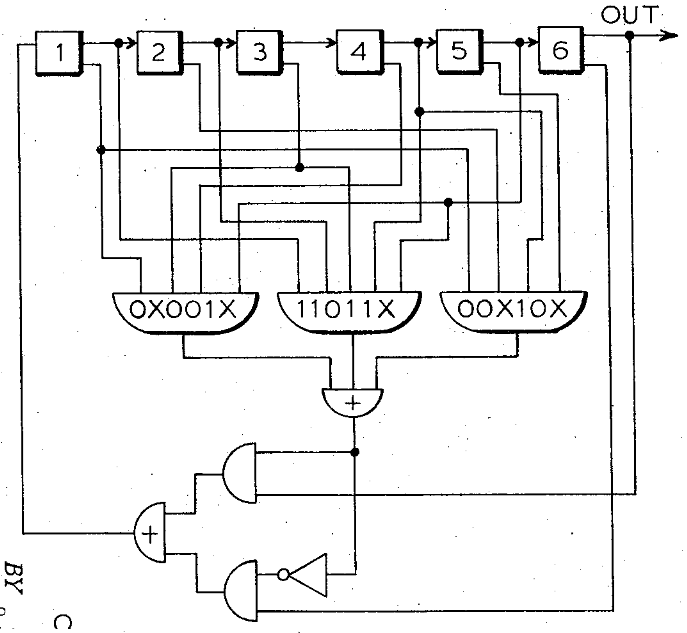
FIG. 2C is a block diagram of a preferred embodiment of a six stage sequence logic network for producing a bit sequence defining 64 ($2^6$) unique six bit subsequences.

Attention is now called to FIG. 2B which illustrates a preferred configuration of sequence logic for generating the sequence of FIG. 2A. It is recognized that innumerable logic configurations could be utilized to generate any particular bit sequence. However, the configurations of FIGS. 2B and 2C are representative of minimal hardware configurations for developing a sequence of the type desired. The sequence logic configuration of FIG. 2B is comprised of four binary stages 34 connected in the form of a shift register with the output terminal 36 of each stage being connected to the input terminal of a succeeding stage. All of the stages 34 are provided with shift input terminals connected in common to a source of shift timing pulses. Feedback logic 40 is provided to force the stages 34 to define the sequence of states illustrated. Feedback logic 40 is responsive to the output of stage 4 and develops a signal for application to the input of stage 1. The feedback logic 40 is based on the following algorithm: the inverse of the output (i.e. stage 4) is fed back to the input (i.e. stage 1) until so doing produces states that have already been defined within a cycle at which time have already been defined within a cycle at which time an exception made and the output itself is fed back. For cases where there are more than four stages it is sometimes necessary to make the exceptions at states preceeding the ones that give a repeated state in order to prevent recycling prior to the maximum length which is $2^N$ stages for N stages. The exceptions then are all that need to be implemented by the feedback logic.

It will be noted from the state table of FIG. 2B that states 8 and 16 are the only states within the 16 state sequence which do not follow naturally by merely coupling the inverse of stage 4 to the input of stage 1. The states preceeding both states 8 and 16 contain the pattern 001 in stages 1–3 and as a consequence in accordance with the typical example illustrated in FIGS. 2A and 2B, it is only necessary that the feedback logic be responsive to the pattern 001. For this purpose, NAND gate 42 is provided to recognize the pattern 001 in stages 1–3. Only when this pattern occurs, does gate 42 provide a false output signal. When gate 42 provides a false output signal, the true output of stage 4 is fed back to the input of stage 1 through gates 44 and 46. When stages 1–3 contain any pattern other than 001, then gate 42 will provide a true output and in this case, the compliment of the output of stage 4 will be provided to the input of stage 1 through gates 48 and 46.

Accordingly, from what has been said thus far, it should be appreciated that as shift pulses are applied to the shift input terminals 38 of the stages of the sequence logic of FIG. 2B, the waveform of FIG. 2A corresponding to the indicated address bit sequence will be developed on the output terminal of stage 4. As will be seen hereinafter, the output of the sequence logic of FIG. 2B is modulated in accordance with a particular signal format and applied to the channel 12 so that each of the stations can extract synchronization information therefrom.

It should be understood that the four bit sequence logic network of FIG. 2B is exemplary only and that longer sequences can be defined utilizing the same algorithm previously expressed and a greater number of shift register stages. As a further example, attention is called to FIG. 2C which illustrates logic for successively and cyclically defining 64 unique states with six shift register stages and a simple feedback network implementing exceptions to the sequence which would be defined by merely coupling the complement of stage 6 to the input of stage 1. From the state table shown in FIG. 2C, it can be seen that exceptions (as indicated by the arrows) must be implemented for states 11, 22, 27, 29, 33, 43, 48, 60, 62, and 63. Since these exception states occur in pairs with redundancy in the sixth stage of the register, only half need be implemented by logic, i.e. states 00001X, 00010X, 11011X, 00110X and 01001X. Since there are further redundancies present in this group the logic can be reduced to three and gates implementing 0X001X, 00X10X, and 11011X. The implementation for this sequence is illustrated in block diagram form in FIG. 2C. The foregoing algorithm can be used to implement logic to generate complete sequences for any value of N.

Figure 3:
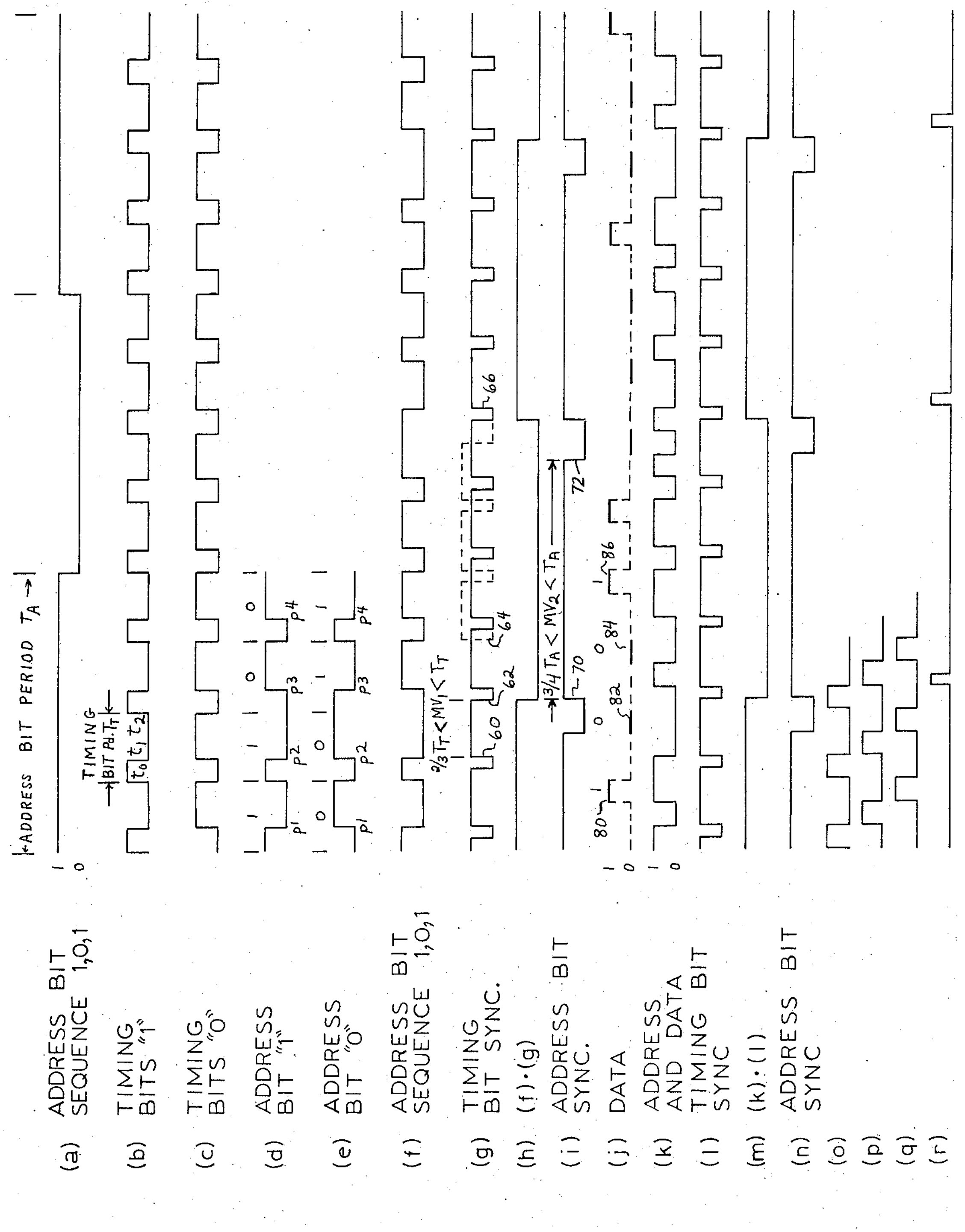
FIG. 3 is a waveform diagram illustrating a preferred coding format in accordance with the present invention for representing both address the data information on a common communication channel in a manner which permits stations coupled to the channel to extract both address and data bit synchronization in addition to address and data information.

In order to better understand the signal format employed in accordance with the present invention, attention is directed to the waveform diagram of FIG. 3 which illustrates a prefered coding format for representing both address and data information on a common channel in a manner which permits stations coupled to the channel to extract both address and data bit synchronization information therefrom. Briefly, in accordance with the invention, address bit periods $T_A$ are successively defined with one address bit period. This has been shown in FIG. 2A. Each address bit is itself a digital sequence as defined in FIGS. 3(*d*) and 3(*e*) which sequences represent respectively logic values 1 and 0 of the transmitted address. Each N adjacent address bits (e.g. N=4) defines a unique address. When a station recognizes its unique address on the channel, it is able to provide data to or extract data from the channel interleaving the data with the address signal. Data bits (FIG. 3(*j*)) are transmitted during particular subtime intervals of each address bit (FIG. 3(*d*) or (*e*)), that is the logic level of the data (FIG. 3(*j*)) replaces, in particular subtime intervals (e.g.$t_2$) the level that the unmodulated address bit (FIG. 3(*d*) or 3(*e*)) would otherwise indicate, resulting in a combined output (FIG. 3(*k*)). More particularly, as will be discussed hereinafter, four timing bit periods are defined during each address bit period. Each timing bit period $T_T$ is comprised of three fractional portions $t_0$, $t_1$, $t_2$. One data bit can be applied to the channel during each such portion $t_2$. Line *a* of FIG. 3 illustrates, in expanded form, a portion of the address bit sequence waveform of FIG. 2A corresponding to the three bit pattern 101. As will be seen hereinafter, in accordance with the present invention, an address bit 1 is applied to the channel as a bilevel signal incorporating appropriately placed signal level transitions and an address bit 0 is represented by a different bilevel signal also incorporating appropriately placed signal level transition. The bilevel signal representations for address bits 1 and 0 respectively are shown in lines (*d*) and (*e*) of FIG. 3. However, prior to considering lines (*d*) and (*e*), attention is called to line (*b*) which illustrates a timing signal comprised of a repetitive signal pattern which will be referred to as a timing bit 1. Note that the timing signal of line (*b*) is comprised of equally spaced pulses. The spacing between the leading edges of each pulse will be referred to as a timing bit period having a duration $T_T$. During each timing bit period $T_T$, reference may be made to three fractional portions $t_0$, $t_1$, $t_2$.

Line (*c*) of FIG. 3 illustrates a different timing signal comprised of a repetitive pattern which will be referred to as a timing bit 0. Note that timing bits 0 and 1 are complimentary. The frequency of the timing signals are equal of lines (*b*) and (*c*). Note that four cycles of the timing bits of lines (*b*) and (*c*) occur during each address bit period $T_A$.

Now proceeding to line (*d*) of FIG. 3 let it be assumed that an address bit 1 is modulated prior to application to the channel so that it is comprised of two successive timing bits 1 followed by two successive timing bits 0. Also, let it be assumed that an address bit 0, as illustrated in Line (*e*) of FIG. 3 is modulated and applied to the channel as two successive timing bits 0 followed by two successive timing bits 1. Note that in the address bit representations of lines (*d*) and (*e*), equally spaced signal level transitions occur at points ***p*1, *p*2, *p*3, and *p*4. Note that during address bit 1, the signal level transitions at points *p*1 and *p*2 are from high to low and at points *p*3 and *p*4 from low to high. Oppositely, for address bit 0, at points *p*1 and *p*2, the signal level transitions are from low to high and at points *p*3 and *p*4,** the signal level transitions are from high to low. Line (*f*) of FIG. 3 illustrates a bilevel waveform pattern corresponding to the bit sequence represented by the waveform of line (*a*), but modulated in accordance with the address bit formats illustrated in lines (*d*) and (*e*). The waveform of line (*f*) represents an address signal which, in accordance with the present invention, is applied to the channel 12 by the address generator 20 of FIG. 1. As shall be seen, the waveform of line (*f*) has the characteristic that both data bit and address bit synchronization information can be extracted therefrom by any of the stations coupled to the channel.

More particularly, attention is now called to line (*g*) which illustrates a timing synchronization signal which can be developed from the address signal of line (*f*). Assume that the timing signal of line (*g*) represents the output of a monostable multivibrator in which the high level represents an unstable state and the low level represents a stable state. Also assume that the monostable multivibrator exhibits an unstable state duration just slightly less than the duration of a bit period $T_T$. More particularly, if the unstable state time duration of the multivibrator is represented by $MV_1$, then let it be defined that $2/3\ T_T < MV_1 < T_T$. Further, let it be defined that the multivibrator will be switched to its unstable state in response to any transition occurring within the address signal of line (*f*) while the multivibrator is in its stable state.

Based on the foregoing assumptions, it will be seen that once the timing signal of line (*g*) is in synchronism with the address signal of line (*f*), it will be switched to its unstable state at pulse edges 60 corresponding to equally spaced transitions *p*1, *p*2, *p*3, and *p*4 occurring within the address signal during each address bit period. Note that after switching to the unstable state, the timing signal of line (*g*) will switch back to the stable state, represented by pulse edges 62, just prior to the end of a timing bit period $T_T$. Note that any transitions occurring within the address signal of line (*f*) between the transitions at points *p*1, *p*2, *p*3, and *p*4 will be ignored because the multivibrator output signal will already be at the unstable state level.

As noted, the solid line representation of line (*g*) of FIG. 3 illustrates the timing signal already synchronized. The dashed line waveform in line (*g*) illustrates the manner in which the timing signal achieves synchronization. More particularly, assume for example that the timing signal switches to the unstable state level at transition 64 coincident with an address signal transition occurring between the equally spaced transitions at points *p*3 and *p*4. The dashed line timing signal will then continue to remain out of synchronization for several cycles but will become synchronized again at pulse edge 66 during the first succeeding timing period in which no address signal transition occurs between equally spaced transitions at points *p*1, *p*2, *p*3, and *p*4. From line (*f*), it will be apparent that no address signal transitions occur between points *p*2 and *p*3 during any address bit period and accordingly the timing signal of line (*g*) will always synchronize within one address bit period. When data is added into the waveform it may take longer than one address period to achieve synchronization.

From what has been said thus far, it should be recognized that the timing synchronization signal shown in line (*g*) of FIG. 3 can be extracted from the address signal of line (*f*). Reference will now be made to lines (*h*) and (*i*) to demonstrate the manner in which address bit synchronization can be achieved. The waveform of line (*h*) is achieved by clocking the address signal of line (*f*) into a delay type flip flop with the timing synchronization pulses of line (*g*). The resulting output waveform of the flip flop (*h*) is forced to the level of the address signal existing just prior to the occurrence of each leading pulse edge 62. The transitions occurring in the waveform of line (*h*) can then be utilized to form an address synchronization signal (line *i*) in substantially the same manner as the timing synchronization signal of line (*g*) was formed. That is, assume a second multivibrator having an unstable state duration represented by $MV_2$. Also assume that any transition occurring within the waveform of line (*h*) forces the second multivibrator to its unstable state which has a duration $MV_2$ where $3/4\ T_A < MV_2 < T_A$. As a consequence, the second multivibrator output signal shown in line (*i*) of FIG. 3 will switch to the unstable state level at pulse edge 70 but will return to the stable state level (pulse edge 72) just prior to the end of an address bit period duration $T_A$. The address bit synchronization signal will then be again switched to the unstable state level by the next transition of the waveform of line (*h*). It will be noted that the pulse edges 70 of the address bit synchronization signal of line (*i*) corresponds in time during each successive address bit period to timing sync transition 62.

Thus far, with respect to lines *a–i* of FIG. 3, we have only discussed the manner in which address bits are encoded into a bilevel signal format (line *f*) and the manner in which timing synchronization (line *g*) and address synchronization (line *i*) information can be extracted from the address bit signal applied to the channel. No explanation has thus far been made as to the manner in which data is applied to the channel.

In accordance with the present invention, as will be discussed in conjunction with the subsequent waveforms in FIG. 3, a data bit can be placed on the channel during each timing bit period (four per address bit period). More particularly, it will be recalled that the assured equally spaced signal level transitions occurring in the address signal of line (*f*) occur at points *p*1, *p*2, *p*3 and *p*4 of each address bit period. In accordance with the present invention, the address signal is forced to either a 1 or 0 level, corresponding to the character of the data bit to be inserted, during a fractional portion of a bit period between successive assured transitions. Thus for example, consider the interval between assured transition points *p*3 and *p*4 during each address bit period of the address signal. It will be recalled that any transition occurring during this internval has no effect on the extraction of the timing and address synchronization information illustrated in lines (*g*) and (*i*) of FIG. 3. Accordingly, based on this recognition, it follows that the interval between the assured signal level transitions, e.g. *p*3 and *p*4, can be utilized to represent data.

More particularly, in order to better explain the manner in which the address signal of line (*f*) is modified to incorporate a data representation therein, assume it is desired to apply data to the channel as represented by the data signal of line (*j*). It will be noted that the data signal of line (*j*) is partially comprised of a solid line and partially comprised of a dashed line. It is only the solid line portions of the waveform of line J which are employed to modify the address signal of line (*f*). For example, assume it is desired to apply the data word 1001 to the channel. One data bit can be applied to the channel during each timing period and accordingly four data bits can be applied to the channel during a single address bit period. Note that the signal portions 80, 82, 84, 86 representing daa in the waveform of line (*j*) are made to occur intermediate the assured level transitions occurring at points *p*1, *p*2, *p*3, and *p*4, in the address signal of line (*f*). As has been mentioned, as long as these assured transitions in the address signal are not modified, then the timing and address synchronization information indicated in lines (*f*) and (*i*) can be extracted by a station coupled to the channel. Thus, the signal waveform of line (*j*) can be utilized to modify the address signal of line (*f*) to produce the composite address and data signal of line (*k*) for application to the channel. Note that the signal waveform of line (*k*) follows the address signal of line (*f*) except during that portion of each timing bit period represented by solid line in line (*j*). During these portions, which it is again pointed out are intermediate the assured transitions *p*1, *p*2, *p*3, and *p*4, the composite address and data signal of line (*k*) follows the data signal of line (*j*).

Line (*l*) of FIG. 3 illustrates a timing synchronization signal, identical to that shown in line (*g*), which can be extracted from the composite address and data signal of line (*k*), in the same manner that the timing synchronization signal of line (*g*) was extracted from the address signal of line (*f*). Similarly, the waveform of line (*m*) can be formed by gating the signal waveforms of lines (*k*) and (*l*) in the same manner that the waveform of line (*h*) was formed by gating signal waveforms (*f*) and (*g*). Similarly, the address synchronization signal of line (*n*), can be formed from the signal of line (*m*) in the identical manner that the signal of line (*i*) was formed from the signal of line (*h*).

From the foregoing, it should now be appreciated that the address generator 20 of FIG. 1 continuously applies an address bit stream to the channel 12 and with the generation of each new address bit, a different four bit address is defined. Thus, during each successive address bit period, a different station is addressed. The addressed station will immediately recognize that it has been addressed and will then become operative to, for example, either apply data to or extract data from the channel during the succeeding address bit period. The data can be applied to or will be available from the channel during the specific portions of each timing bit period corresponding to the solid line portions of the waveform of line (*j*). More particularly, as will be seen hereinafter, three timing pulse signals, represented in lines (*o*), (*p*), and (*q*) of FIG. 3 are locally developed at each station in response to the timing synchronization information represented in line (*l*), extracted from the signal on the channel. It will be noted that the pulses of the signals of lines (*o*), (*p*), and (*q*) respectively represent the fractional portions of a timing bit period identified at $t_0$, $t_1$, and $t_2$ in line (*b*) of FIG. 3. As will be seen hereinafter, the pulses of the timing signal of line (*q*), corresponding to the fractional portion $t_2$ of a timing period occur intermediate between the assured pulse transitions *p*1, *p*2, *p*3, and *p*4, and identify the times at which data is to be applied to or extracted from the channel. The means of interleaving the data bits with the address waveform is simply to use the signal of line (*q*) of FIG. 3, available in both the address generator and the remote stations to decouple the address generator from and couple the data bit source to the channel during times $t_2$. Conversely, the data bit source is decoupled from and the address generator is coupled to the channel during times $t_0$ and $t_1$. In this manner, both the address and data are interleaved in the same signal stream.

Figure 4A:
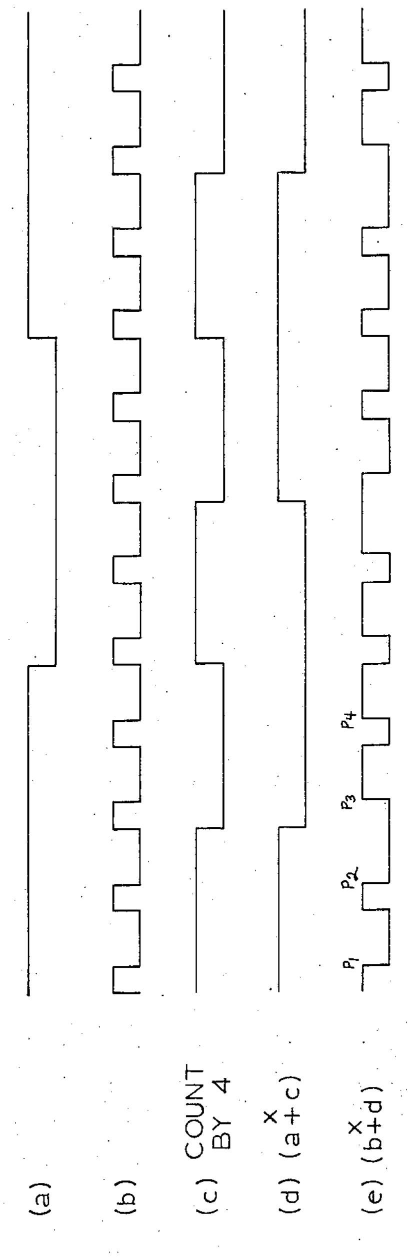
FIG. 4A is a waveform diagram illustrating a manner in which the address bit sequence represented in FIG. 2A can be operated upon to produce a signal format in accordance with FIG. 3.
Figure 4B:
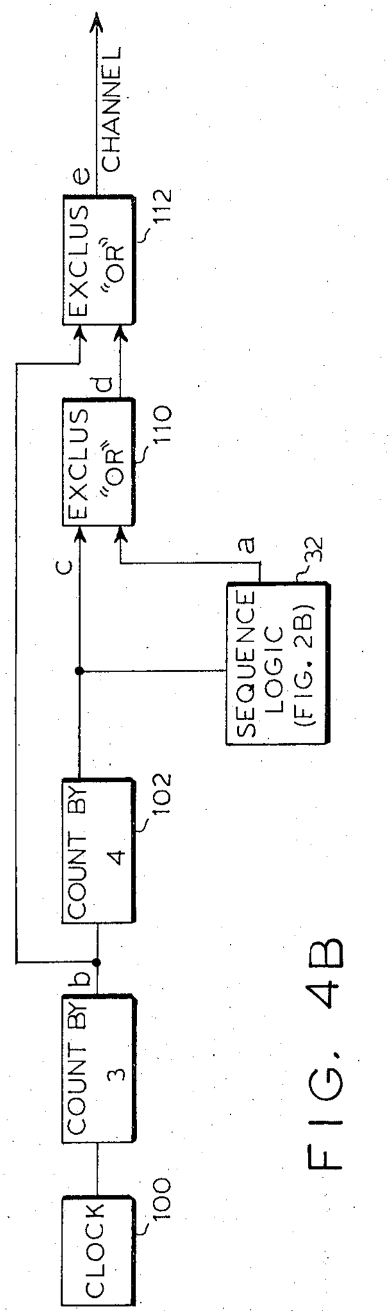
FIG. 4B is a block diagram illustrating an address generator, including the sequence logic of FIG. 2B, for producing the signals represented in FIG. 4A.

Attention is now called to FIGS. 4A and 4B which together illustrate the operation and logical construction of the address generator 20 of FIG. 1. Briefly, the apparatus of FIG. 4B functions to convert the output signal developed by the sequence logic of FIG. 2B into an address signal having the format represented in line (*f*) of FIG. 3. Line (*a*) of FIG. 4A corresponds to line (*a*) of FIG. 3 and represents a portion of the output waveform developed by the sequence logic of FIG. 2B. Line (*e*) of FIG. 4A is identical to line (*f*) of FIG. 3 and represents the address signal to be applied to the channel 12. Lines (*b*), (*c*), and (*d*) of FIG. 4A illustrate signal waveforms occurring in the apparatus of FIG. 4B which explain the manner in which the signal of line (*a*) is converted to the format of line (*e*).

More particularly, note that the signal waveform of line (*b*) of FIG. 4A constitutes the timing signal illustrated in line (*b*) of FIG. 3. The signal waveform of line (*c*) of FIG. 4A can be formed by a count by four circuit responsive to the timing signal of line (*b*). Thus, the waveform of line (*c*) is at a high level for one-half of the address bit period and at a low level for the other half of the address bit period. The waveform of line (*d*) is easily formed by developing the "exclusive or" function of the waveforms of lines (*a*) and (*c*). The waveform of line (*e*) of FIG. 4A can then be obtained by developing the exclusive-or function of the waveforms of lines (*b*) and (*d*). Note that when the signal levels of lines (*b*) and (*d*) are the same, the waveform of line (*d*) is high. When the levels of lines (*b*) and (*d*) differ, the waveform of line (*e*) is low. It should be recognized that the waveform of line (*e*) of FIG. 4A is identical to the address signal waveform represented in line (*f*) of FIG. 3.

Attention is now called to FIG. 4B which illustrates, in block diagram form, a simple apparatus incorporating the sequence logic of FIG. 2B, for developing the address signal of line (*e*) of FIG. 4A. The apparatus of FIG. 4B includes an oscillator 100 followed by a count by three circuit 106 which provides the timing signal represented in line (*b*) of FIG. 4A. These clock pulses are counted by a count by four circuit 102 which in turn develops shift pulses for application to the sequence logic 32. That is, the sequence logic 32 will generate one address bit per every four pulses provided by clock pulse source 100.

The output of the count by four circuit 102 is also applied to the input of a first exclusive-or circuit 110. The output of the sequence logic circuit 32 is also applied to the input of the exclusive-or circuit 110 which consequently develops at its output terminal the waveform corresponding to that shown in line (*d*) of FIG. 4A. The output of circuit 110 is coupled to the input of a second exclusive-or circuit 112. A second input to the exclusive-or circuit 112 is derived from the output of the clock circuit 106. As a consequence, the circuit 112 will provide the address signal represented in line (*e*) of FIG. 4A. The output of circuit 112 will of course be coupled to the channel 12 of FIG. 1.

Figure 5:
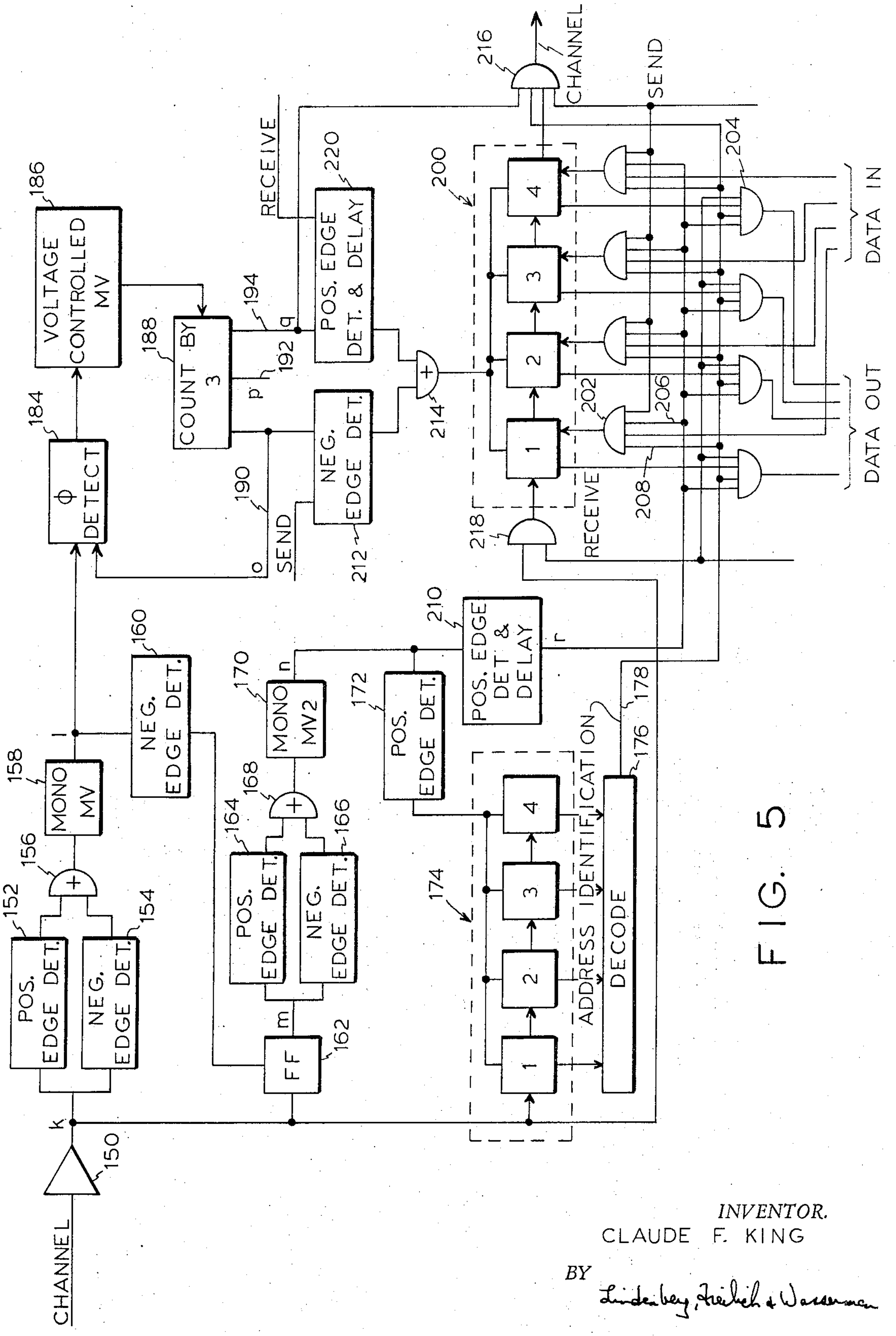
FIG. 5 is a block diagram of a basic modem constituting part of a typical remote station coupled to the common channel.

Attention is now called to FIG. 5 which illustrates a basic modem constituting a portion of each remote station coupled to the channel 12. It is contemplated that the apparatus of FIG. 5 can operate in a send or receive mode. That is, when operating in the send mode, the station will apply data to the channel in response to recognizing an address. When operating in the receive mode, in response to recognizing an address on the channel, a station will become operative to accept four data bits from the channel. In an actual system, it is recognized that some stations may constitute send only stations or receive only stations. The embodiment of FIG. 5 for selectively operating in either a send of receive mode is illustrated to indicate that the hardware required for either mode of operation is substantially identical. As has been previously mentioned, the address generator 20 of FIG. 1 may be coupled to the channel at any point and may indeed be physically located at any one of the indicated remote stations. It is also to be recognized that two or more addressable stations may be physically located at any one site along the channel. That is, the term station has been used herein primarily to designate an addressable entity. Thus two or more transducers, for example respectively monitoring temperature and pressure, may be physically located at the same site although they are respectively identified by different four bit addresses.

Each remote station includes an amplifier 150 whose input is connected to the channel 12. The amplifier 150 provides an output signal constituting the composite address and data signal represented in line (*k*) of FIG. 3. This signal is applied to a positive going edge detector 152 and a negative going edge detector 154. The edge detectors 152, 154, in response to detecting positive and negative going signal edges respectively, provide output pulses to OR gate 156. The output of OR gate 156 is connected to the input terminal of a first monostable multivibrator 158. The monostable multivibrator 158 exhibits an unstable state duration $MV_1$ where $\frac{2}{3} T_T < MV_1 < T_T$. When in its stable state, each pulse provided by the OR gate 156 to the multivibrator 158 will switch it to its unstable state. As previously discussed in connection with line (*g*) of FIG. 3, the output signal provided by the multivibrator 158 will after a certain number of timing bit periods $T_T$ synchronize with the assured equally spaced transitions at *p*1, *p*2, *p*3, and *p*4 defined during each address bit period of the channel signal. Thus, the multivibrator 158 will provide an output signal corresponding to the timing synchronization signal shown in line (*l*) of FIG. 3.

The output of the multivibrator 158 is applied to a negative going edge detector 160 which in turn develops a timing pulse for a flip-flop 162. The composite address and data signal of line (*k*) of FIG. 3 is applied to the flip-flop input terminal. As a consequence, the flip-flop 162 will yield the output signal represented in line (*m*) of FIG. 3. As will be recalled, this signal is a bilevel signal in which a signal level transition occurs once in each address bit period, coincident with the transition occurring in the channel signal at p3. If the address bit is 1 then the transition, as shown in line (*m*), is from high to low. If the address bit is 0, the transition in the signal of line (*m*) is from low to high.

The output signal provided by flip-flop 162 is applied to the input of positive and negative going edge detectors 164 and 166. The outputs of edge detectors 164 and 166 are applied to an OR gate 168. The output of OR gate 168 is applied to the input of a monostable multivibrator 170 which defines an unstable state duration $MV_2$ where $\frac{3}{4} T_A < MV_2 < T_A$. As a consequence, the multivibrator 170 will yield an output signal constituting the address bit synchronization signal shown in line (*n*) of FIG. 3. The positive going edges of the address bit synchronization signal are detected by edge detector 172 and applied to the shift input terminals of a four bit shift register 174. The four bit shift register 174 can be considered as defining the address window 30 mentioned in the explanation of FIG. 2A.

More particularly, each positive going edge of waveform (*n*) will occur coincident with the transition at *p*3 during each address bit period. It will be recalled that the level of the channel signal (line (*k*) of FIG. 3) just prior to the transition at *p*3 will be indicative of the state of the address bit. That is, recall from lines (*d*) and (*e*) of FIG. 3 that just prior to the transition at *p*3, the signal will be low if the address bit is 1 and high if the address bit is 0. Thus, as each positive going edge in the waveform (*n*) is detected by the edge detector 172, a new address bit will be entered into stage 1 of the four bit register 174 and the remaining bits within the register will be shifted right one stage. Thus, as explained in connection with FIG. 2, each address period will yield a new four bit address in the register 174. The output of the four stages of register 174 are connected in parallel to a decoder circuit 176. The decoder circuit 176 in each station looks for a particular four bit pattern and when it recognizes it in the register 174 generates an address identification control signal on line 178. As will be explained in greater detail hereinafter, the address identification control signal 178 is utilized by the station to either extract four data bits from the channel during a succeeding address bit period (receive mode) or apply four data bits to the channel during the succeeding address bit period (send mode).

The portion of the apparatus of FIG. 5 thus far discussed, operates to monitor the addresses successively being defined on the channel. The remainder of the apparatus illustrated in FIG. 5 becomes operative primarily after the station address has been recognized and the address identification control signal has been developed on line 178. The remaining portion of FIG. 5 includes a phase lock loop comprised of a phase detector 184, a voltage controlled multivibrator 186, and a count by three circuit 188. The timing bit synchronization signal provided by multivibrator 158 is applied to one input terminal of the phase detector 184. The output of the phase detector 184 is applied to the voltage controlled multivibrator 186. The multivibrator 186 develops output pulses at a rate determined by the voltage magnitude applied thereto. The pulses provided by multivibrator 186 are counted by the circuit 188 and in response, the circuit 188 provides one output pulse on line 190 for each three pulses supplied by multivibrator 186. The phase of the pulses supplied on line 190 are compared with the pulses provided by multivibrator 158 to the detector 184 which develops a voltage signal related to the difference in phase. The voltage signal developed by the phase detector 184 is essentially used as an error signal to modify the frequency of the multivibrator 186. As a consequence of the closed loop arrangement, the pulses occurring on line 190 will synchronize with the pulses provided by multivibrator 158. The synchronized pulse waveform with will appear on line 190 of FIG. 5 is represented in line (*o*) of FIG. 3. The count by three circuit 188 also supplies the pulse trains indicated in lines (*p*) and (*q*) of FIG. 3 on terminals 192 and 194. It will be recognized from FIG. 3 that the pulses of the waveform of line (*q*) occur coincident with the fractional portion $t_2$ of eace timing bit period (see line (*b*), FIG. 3). It will be recalled that it is during this fractional portion of each timing bit period that data bits are to be applied to or extracted from the channel. Accordingly, the pulses depicted on line (*q*)

of FIG. 3, available on terminal 194 of circuit 188, are used to control a four bit data register 200.

It has been mentioned that the exemplary apparatus of FIG. 5 can be selectively utilized in either a SEND mode or RECEIVE mode. When the apparatus is operating in a SEND mode, four data bits are loaded into the register 200 in parallel (via gates 202) and then are shifted out serially at the appropriate time to apply the bits to the channel. On the other hand, when the apparatus of FIG. 5 is operating in the RECEIVE mode, four data bits are extracted from the channel and serially loaded into the register 200. They then may be read out from the register 200 in parallel via gates 204.

More particularly, initially considering the SEND mode, note that the stages of register 200 can be loaded in parallel via gates 202 with the four data bits which it is desired to apply to the channel. The gates 202 are enabled in response to a timing signal applied to gate input terminal 206 concurrent with the application of the address identification control signal to gate input terminal 208. The timing signal applied to gate input terminal 206 is developed by the positive edge detector and delay circuit 210 and is illustrated in line (*r*) of FIG. 3. The circuit 210 is responsive to the output of multivibrator 170 whose output is represented by the wave form of line (*n*) of FIG. 3. The circuit 210 will provide an output timing pulse (line *r*) after the termination of the timing bit sync pulse (line *l*) ) occurring immediately subsequent to the positive edge of the waveform of line (*n*). When the gates 202 are enabled by the concurrence of the address identification signal and the timing pulse of line (*r*), four data bits will be loaded in parallel into the register 200. These bits will then be shifted to the right one stage in response to each subsequent pulse appearing on the terminal 190 of the count by 3 circuit 188. More particularly, the terminal 190 is coupled to the input of a negative edge detector 212 which is enabled during the SEND mode. The output of detector 210 is coupled to the input of an OR gate 214 whose output in turn is connected to the shift input terminals of all stages of the register 200. The state of the last stage of register 200 is applied to the channel via gate 216 which is enabled, during the SEND mode by the concurrence of the appropriate address identification control signal and the timing pulses appearing on the terminal 194 of the count by three circuit 188. Line (*q*) of FIG. 3 illustrates the pulses developed on terminal 194 and it will be recalled that these pulses define the data bit intervals. Thus, when the address of a particular station is identified and that station is operating in the SEND mode, it will apply data bits to the channel via gate 216 during successive data bit intervals defined by the pulses represented on line (*q*) of FIG. 3.

When operating in the RECEIVE mode, the data bits appearing on the channel will be seria ly loaded into the register 200 and continually shifted to the right. However, the register 200 will be sampled via gate 204 only when the address identification control signal for the particular station occurs. More particularly, note that the output of amplifier 150 is connected to the input of gate 218 which is enabled during the RECEIVE mode. The output of gate 218 is connected to the data input of stage 1 of register 200. When operating in the RECEIVE mode, shift pulses will be developed by the positive edge detector and delay circuit 220 for application through the OR gate 214 to the shift terminals of register 200. The circuit 220 is responsive to the pulses appearing on terminal 194 of the count by three circuit 188. It will be recalled that the waveform of line (*q*) of FIG. 3 depicts the signal appearing on terminal 194. It will further be recalled that the pulses of line (*q*) define the data bit intervals and the purpose of circuit 220 is to develop a shift pulse occurring somewhere within the data bit interval when it is certain that the data bit on the channel is available at the input of gate 218. A four bit data word is read in parallel from the register 200 by data output gates 204 which are enabled in the RECEIVE mode in response to a timing signal produced by the aforementioned circuit 210 occurring concurrent with the application of an address identification control signal developed by the decoder circuit 176. That is, the stages of register 200 will be sampled concurrent with the pulses depicted in line (*r*) of FIG. 3.

In view of the foregoing, the operation of a system in accordance with the invention should now be appreciated. Although the basic modem illustrated in FIG. 5 is typical of those to be employed in systems in accordance with the present invention, certain useful modifications deserve mentioning. For example, although the illustrated modem is selectively operable in either a SEND or RECEIVE mode, in actual usage, it may in some instances, be desirable to employ distinct SEND and RECEIVE units. Moreover, in the configuration illustrated in FIG. 5 it will be recognized that the station will send (or receive) only one four bit data word during each complete address cycle defined by the address generator. It may, in some instances, be desirable to allot more than one address to a particular station. For example, if it is desired that a particular station send eight bits during each cycle of the address generator, then two distinct addresses should be allotted to that station. This of course can be easily implemented by providing a second decoder circuit responsive to the contents of register 174 for developing an address identification control signal when that second address is recognized on the channel. However, rather than provide separate decoder circuits for each of the plural addresses which may be assigned to a particular remote location, a minimum hardware configuration can be achieved by utilizing a single decoder circuit, as represented in FIG. 5, together with a sequencing or counting circuit responsive to the address identification control signal provided by that single decoder circuit. For example, if it is desired to assign five addresses to a particular remote location, it is efficient to select five successive addresses from the address generator sequence as depicted in FIG. 2. Then, after the initial address is recognized by the decoder circuit, that location will be held operative during each of the succeeding address bit periods assigned to that station.

From the foregoing it will be recognized that a data communication system has been disclosed herein for enabling addressed data to be efficiently communicated between dispersed stations coupled to a common channel. Although a preferred embodiment of the invention has been disclosed, it is recognized that still other variations and modifications within the scope of the invention will occur to those skilled in the art. Thus, the roles of the address and data bits can be interchanged or the number of phases per address bit period can be increased. Additionally, similar, but somewhat different, techniques can be employed for mixing the data bits into the address signal. Additionally, means could be readily incorporated in a system in accordance with the invention for selectively aborting particular addresses within the address sequence in order to force a particular address during any cycle. In this manner, the system could function as either a sequential or random access system. Further, it should be recognized that the term communication system has been used broadly herein and is intended to include both real time communication systems as well as systems for storing information for communication at a later time, such as magnetic tape storage units.

What is claimed is:

1. In a system for communicating addressed digital data between dispersed stations via a common communication channel coupled to said stations, the improvement comprising:

generator means for generating a sequence of M address bits in which adjacent addres bits are spaced uniformly in time by an adress bit period, said sequence containing a plurality of unique subsequences of N adjacent address bits, each subsequence comprising an address;

means responsive to said generated address bits for producing an address signal containing a set of equally spaced transitions between first and second signal levels, said equally spaced transitions defining a set of data bit periods during each successive address bit period, a first group of transitions in each set being from said first to said second level if the address bit is 1 and from said second to said first level if the address bit is 0 and a second group of transitions in each set being from said second to said first level if the address bit is 1 and from said first to said second level if the address bit is 0;

means applying said address signal to said communication channel;

means at each of said stations for detecting the occurrence of said equally spaced transitions in said address signal;

means at each of said stations for detecting the occurrence of a particular transition in each set of transitions in said address signal;

address register means at each of said stations for storing N address bits;

means at each of said stations responsive to the detection of said particular transition during each set of transitions and to the level of said address signal for storing an address bit in said address register means thereat; and means at each of said stations responsive to a particular N bit pattern stored in said address register means thereat for generating a data control signal.

2. The system of claim 1 including data register means at least one of said stations for storing a plurality of data bits;

means at each of said stations responsive to the detection of said equally spaced transitions for generating data timing signals intermediate successive transitions; and means responsive to said data control signal for applying said address signal to said data register means coincident with the generation of said data timing signals.

3. The system of claim 1 including data register means at least one of said stations for storing a plurality of data bits;

means at each of said stations responsive to the detection of said equally spaced transitions for generating data timing signals intermediate successive transitions; and means responsive to said data control signal for forcing said address signal to a level determined by the state of a different one of said stored data bits coincident with the generation of each of said data timing signals.

4. The systemof claim 1 wherein said generator emans cyclically generates a sequence of M address bits in which the bit pattern of every group of N adjacent bits is unique within said sequence.

5. The system of claim 1 wherein said means for detecting the occurrence of said equally spaced transitions includes means for detecting any transition in said address signal; and first monostable multivibrator means responsive to the detection of any address signal transition for switching to an unstable state, said first monostable multivibrator means exhibiting an unstable state duration slightly shorter than the duration between said equally spaced pulses.

6. The system of claim 1 wherein said address signal is characterized by a bilevel waveshape defining different first and second repetitive patterns respectively during first and second portions of an address bit period representing an address bit 1 and second and first repetitive patterns respectively during first and second portions of an address bit period representing an address bit 0.

7. The system of claim 1 wherein said address signal is characterized by a bilevel waveshape defining different first and second repetitive patterns respectively during first and second portions of an address bit period representing an address bit 1 and second and first repetitive patterns respectively during first and second portions of an address bit period representing an address bit 0;

said means for detecting the occurrence of said equally spaced transitions including means for detecting any transition in said address signal;

first monostable multivibrator means responsive to the detection of any address signal transition for switching to an unstable state, said first monostable multivibrator means exhibiting an unstable state duration slightly shorter than the duration between said equally spaced pulses;

said means for detecting the occurrence of a particular transition including means responsive to the level of said address signal at the occurrence of said equally spaced transitions and second monostable multivibrator means responsive to change in level of said address signal between the occurrence of successive equally spaced transitions for switching to an unstable state, said second monostable multivibrator means exhibiting an unstable state duration slightly shorter than the duration of an address bit period.

8. A system for communicating addressed digital data between dispersed stations via a common communication channel coupled to said stations, said system comprising:

address generator means applying an address signal to said channel defining a sequence of bits comprised of bit subsequences, each subsequence of adjacent bits constituting a unique address;

means at each of said stations responsive to a particular one of said unique addresses for producing an address identification control signal;

means associated with at least one of said stations and responsive to an address identification control signal produced thereat for applying a data signal representing a multibit data word to said channel;

said address generator means including means forming unique transitions in said address signal, equally spaced in time, between first and second signal levels to define an address bit period therebetween; and wherein said means associated with at least one of said stations applies said data signal representative of said multibit data word to said channel during a single address bit period.

9. The system of claim 8 wherein said address signal includes spaced level transitions occurring therein within an address bit period to define multiple data bit periods during each address bit period; and wherein said means applying said data signal includes means for modulating said address signal during a portion of each of said data bit periods.

10. The system of claim 9 wherein each of said stations includes means responsive to said address signal level transitions for producing synchronization signals identifying the time occurrence of said address and data bit periods; and means for sampling the level of said address signal at time indicated by said synchronization signals to extract address and data bit information from said address signal.

11. The system of claim 8 wherein said means applying said address signal to said channel includes means for cyclically generating a sequence of M address bits wherein every subsequence of N adjacent bits within a cycle is unique.

* * * * *